US007018720B1

(12) United States Patent
Schallner et al.

(10) Patent No.: US 7,018,720 B1
(45) Date of Patent: Mar. 28, 2006

(54) LAYER SEQUENCE BUILT ON A SUBSTRATE IN THIN-FILM TECHNOLOGY

(75) Inventors: Martin Schallner, Ludwigsburg (DE); Soeren Steinert, Backnang (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/532,144

(22) Filed: Mar. 21, 2000

(30) Foreign Application Priority Data

Mar. 25, 1999 (DE) ........................................ 199 13 466

(51) Int. Cl.
*B32B 3/10* (2006.01)

(52) U.S. Cl. ....................... 428/600; 428/636; 428/614; 428/673; 428/935; 428/938

(58) Field of Classification Search ................. 428/600, 428/636, 673, 938, 935, 621, 614; 205/186, 205/95
See application file for complete search history.

(56) References Cited

U.S. PATENT DOCUMENTS 3,556,951 A * 1/1971 Cerniglia ..................... 205/95
4,005,456 A * 1/1977 Botzenhardt ................. 351/71
4,357,395 A * 11/1982 Lifshin et al. .............. 428/606
5,015,338 A * 5/1991 Tabuchi et al. ............... 205/95
5,167,776 A * 12/1992 Bhaskar ....................... 205/75
5,349,500 A * 9/1994 Casson et al. .............. 361/749
5,454,904 A * 10/1995 Ghezzo et al. ................ 216/13

FOREIGN PATENT DOCUMENTS

DE 198 21 382 A1 11/1999

OTHER PUBLICATIONS

Lasertrim Capacitors, Johanson Technology, Camarillo, CA, USA., pp. 1–23 (no date).

* cited by examiner

*Primary Examiner*—John J. Zimmerman
(74) *Attorney, Agent, or Firm*—Michael J. Striker

(57) ABSTRACT

The layer sequence built on a substrate in thin-film technology includes an electrically conductive sputtered layer and an electrically conductive reinforcing layer for reinforcing or strengthening the sputtered layer, which is applied on the sputtered layer by a method other than sputtering. In order to remove conducting material from the conductive layers with the aid of a laser for the purposes of adjustment while producing as little contaminating material as possible, the electrically conductive reinforcing layer has a reduced thickness or is completely eliminated in regions of the electrically conductive layers to be adjusted than in other regions outside of the regions to be adjusted.

9 Claims, 2 Drawing Sheets

LAYER SEQUENCE BUILT ON A SUBSTRATE IN THIN-FILM TECHNOLOGY

BACKGROUND OF THE INVENTION

The present invention relates to a layer sequence built on a substrate in thin-film technology and, more particularly, to a layer sequence comprising an electrically conductive sputtered layer, which is reinforced by a similar electrical conductive reinforcing layer, which is applied to the electrically conductive sputtered layer by a method other than sputtering.

Laser adjustment of resistors has been used for many years to adjust operation and to compensate for manufacturing tolerances in the field of thin-film and thick-film technology. The resistors on substrates or boards are adjusted to their set value, before the substrates or boards are equipped with components, or to a computed resistance value according to the component characteristic values (e.g. capacitance). A slight amount of residue is produced by the adjustment because of the type of material being worked. This residue can be removed, if necessary, after the adjustment by cleaning.

Furthermore for a few years metallic conductive layers (e.g. Gold layers) have been removed or eroded from capacitors, in order to change their capacitance and thus to be able, for example, to adjust the resonance frequencies of oscillator circuits (Lasertrim Capacitors, Johnson Technology, Camarillo, Calif.). This adjustment is also an operational adjustment. Of course extraneous contaminant material is produced during this adjustment procedure near the adjusted locations, but this contaminant material is of little significance for these components in housings, since they are used in connection with adjustable capacitors in the frequency range of up to a few 100 MHz.

However laser adjustment of (metallic conductive) thin-film structures, for example of resonators formed from structured gold on ceramic material (see tuning of ring resonators as described in the still unpublished German Patent Application 198 21 382) is new. Here also an operational adjustment is performed.

During laser erosion of 3 to 5 μm thick gold layers, as often employed in thin-film technology, gold-containing deposits with particle sizes of up to a few tens of micrometers arise. These deposits are very problematical, since open semiconductors (e.g. transistors with 0.25 μm gate structures) are often used in thin-film technology, which are comparatively sensitive to extraneous contaminant material. A cleaning to remove the residue formed by the adjustment is only possible in certain special cases, since the operational adjustment primarily occurs with the components completely assembled on the board or chip. During an adjustment the extraneous deposited particles are only partially removed by vacuuming techniques.

SUMMARY OF THE INVENTION

It is an object of the present invention to provide a layer sequence on a substrate of the above-described type, which avoids the above-described disadvantage during an adjustment performed by using a laser to remove material.

These objects, and others, which will be made more apparent hereinafter, are attained in a layer sequence built on a substrate in thin-film technology, said layer sequence comprising an electrically conductive sputtered layer, which is reinforced by a similar electrically conductive reinforcing layer, which is applied to the electrically conductive sputtered layer by another method and at least one electronic component.

According to the invention regions of the electrically conductive sputtered layer to be adjusted, i.e. by the laser adjustment method, are not reinforced by the reinforcing layers as much as the remaining portions of the electrically conductive sputtered layer.

Extraneous contaminant material produced by the laser erosion or removal method during an adjustment can be minimized with the layer structure according to the invention, which is shown by the following disclosure.

In a conventional layer sequence in thin-film technology according to FIG. 1 an adherent sputtered layer 2 having a thickness of a few tens of nanometers is provided first on a substrate 1. Then a sputtered resistor layer 3 with a thickness of the same order of magnitude as the first sputtered adherent layer 2 is applied over it. Then similarly a gold sputtered layer 4 having a thickness in a range between about 200 nm and 400 nm is applied over the sputtered resistor layer 3. Finally an additional gold reinforcing layer 5, which was produced by galvanic deposition, chemical reinforcement or physically (for example by rolling on or spraying), having a thickness of about 2 to 10 micrometers was provided on the gold sputtered layer 4.

The above-described contamination problem is largely avoided because the reinforcement of the conductive sputtered layer is completely or partially eliminated in the regions in which the laser adjustment is to be performed. Because of that feature the material erosion during the adjustment is considerably reduced. Thus, for example, when the reinforcing layer is completely removed from a location or region to be adjusted, a sputtered layer of only about 300 nm is removed during the adjustment, instead of a 5 μm thick reinforcing gold layer. Because of that the amount of eroded or removed material is reduced by about 94%. Furthermore the conductive sputtered layer is essentially more fine-grained than the reinforcing layer, so that particles arising during laser adjustment are correspondingly smaller and vaporize.

However because of the reduced layer thickness the surface resistance of the remaining layers increases and thus current losses increase. However at high frequencies this increase is small, since the current scarcely penetrates into the conductor because of skin effect and only flows in a thin layer in the conductor surface. The current losses are proportional to the existing current density. The increase of losses because of the thinner conductive layer sequence can be minimized because the adjusted regions, if circuit engineering techniques permit, are provided in regions, in which no or only a small amount of current flows, for example at the end of an open conductor. Furthermore the adjusted regions are generally small in comparison to the entire conductor structure. Consequently the local increase of the surface resistance has scarcely any effect on the losses of the entire conductor structure.

In circuits, in which some increase in losses is tolerable, the entire board or substrate can also be provided with a thin conductive layer, whereby processing effort and thus expenses are reduced. Generally assembly of components or connections by means of bonding wires is expensive.

Additional advantageous embodiments are set forth in the dependent claims appended hereinbelow, whose features, as far as it is significant, may be combined with each other.

BRIEF DESCRIPTION OF THE DRAWING

The objects, features and advantages of the invention will now be illustrated in more detail with the aid of the following description of the preferred embodiments, with reference to the accompanying figures in which.

Parts in different figures that are substantially the same are given the same reference numbers.

DESCRIPTION OF THE PREFERRED EMBODIMENTS

The figures show several examples including optimized layer sequences according to the invention.

Figure 1:
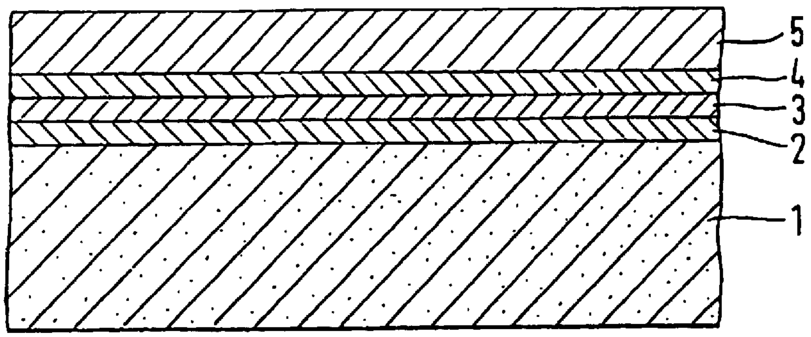
Fig.1 (PRIOR ART)
FIG. 1 is a schematic cross-sectional view through a layer sequence of the prior art.
Figure 2:
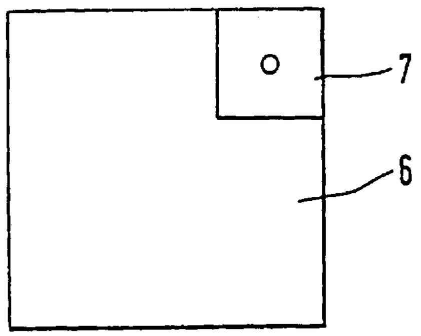
FIG. 2 is plan view of a chip capacitor.
Figure 3:
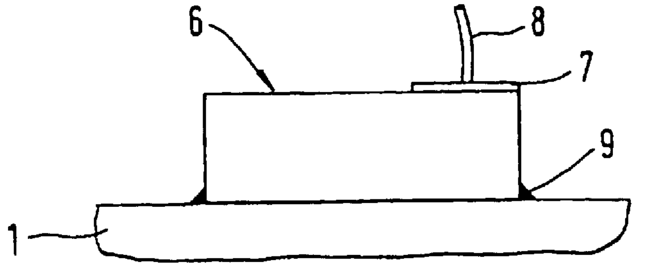
FIG. 3 is a side view of a the chip capacitor.

FIGS. 2 and 3 show a chip capacitor, which is metallized on its upper and lower side surfaces. If only a part of the surface on the upper side in a region 6 to be adjusted is coated with a thin metal layer, it can be adjusted. The portion 7 of the upper surface or top surface with the conventional layer sequence of FIG. 1 and bonding wire 8 act as a connector for the upper capacitor side. A solder or adhesive connection 9 is made to the substrate 1 on the lower side of the capacitor.

Figure 4:
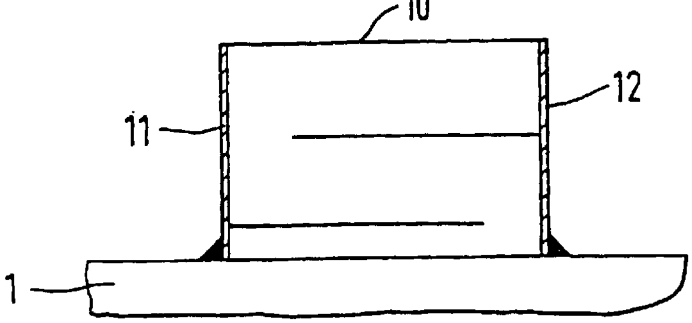
FIG. 4 is a side view of a ceramic capacitor in SMD technology.

The entire upper covering metal layer 10 can be made thin in ceramic capacitors in SMD technology (see Lasertrim Capacitors, Johnson Technology, Camarillo, Calif.). A multi-layer ceramic capacitor in SMD technology is shown in FIG. 4 with its contacting surfaces 11 and 12 for adhesives or solder.

Figure 5:
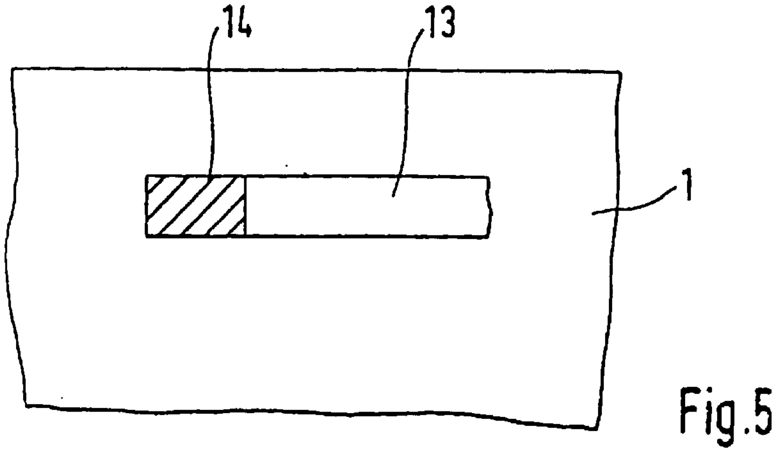
FIG. 5 is a plan view of an end of an open-circuit strip line.

For adjusting of the conductor length of an open-circuit strip line 13 the metallization at the open conductor end 14 is made thin, as shown in FIG. 5.

Figure 6:
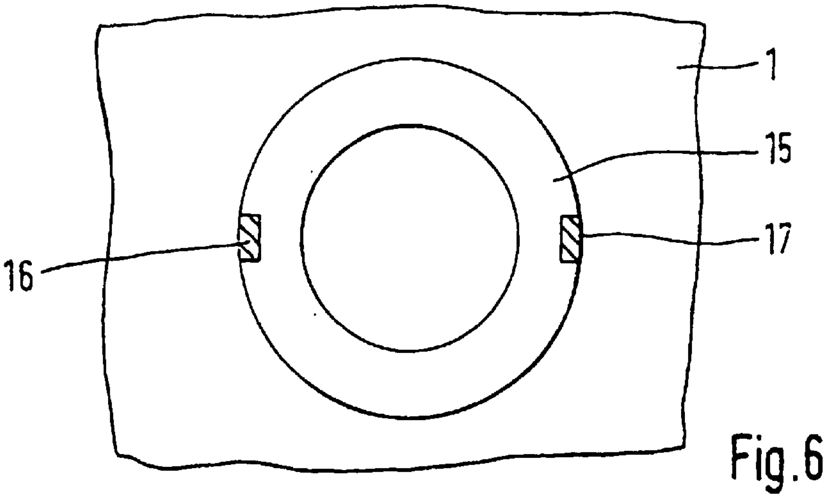
FIG. 6 is a plan view of a ring resonator.

The resonance frequency of the ring resonator 15 shown in FIG. 6 can be changed by targeted incisions or cuts made by laser. Also the metallization in the regions 16, 17 to be adjusted is thin (see German Patent Application 198 21 382).

Figure 7:
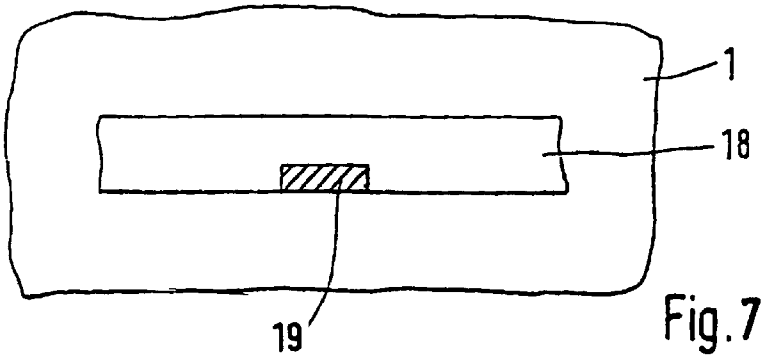
FIG. 7 is a connecting line.

If adjustments of a conducting line 18, which for example is used as a connecting conductor for different components, are required, as shown in FIG. 7, the region 19 to be adjusted is metallized comparatively thin.

The disclosure in German Patent Application 199 13 466.9 of Mar. 25, 1999 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in layer sequences built on substrates in thin-film technology, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. In a substrate and layer sequence built on said substrate in thin-film technology, said layer sequence comprising an electrically conductive sputtered layer, an electrically conductive reinforcing layer provided on the sputtered layer to reinforce or strengthen the sputtered layer and at least one electronic component, said reinforcing layer being provided by a method other than sputtering and material being removed from regions of said sputtered layer and said reinforcing layer by means of laser erosion in order to perform an electronic adjustment of said at least one electronic component, said laser erosion producing contaminating conductive deposits on said layer sequence, the improvement characterized by at least partially eliminating said electrically conductive reinforcing layer from said regions prior to said laser erosion;

whereby said contaminating conductive deposits produced by said laser erosion are at least partially eliminated.

2. The improvement as defined in claim 1, wherein said electrically conductive reinforcing layer is formed with a smaller thickness in said regions than outside of said regions.

3. The improvement as defined in claim 1, wherein said electrically conductive reinforcing layer is formed so that said reinforcing layer does not cover or extend over said sputtering layer in said regions.

4. The improvement as defined in claim 1, wherein a resistor layer is provided between said electrically conductive sputtered layer and said substrate and said electrically conductive reinforcing layer is provided on a side of said electrically conductive sputtered layer opposite from said resistor layer.

5. The improvement as defined in claim 1, 2, 3 or 4, wherein said electrically conductive sputtered layer consists of gold.

6. The improvement as defined in claim 1, 2, 3 or 4, wherein said electrically conductive reinforcing layer consists of gold.

7. The improvement as defined in claim 1, 2 or 3, wherein said regions are located in portions of said layer sequence carrying less current than other portions.

8. The improvement as defined in claim 1, 2 or 3 wherein at least one of said regions is located at an end of an open strip line.

9. The improvement as defined in claim 1, wherein said at least one electronic component is a resistor, a capacitor or a ring resonator.

* * * * *